United States Patent [19]

Nakaie et al.

[11] Patent Number: 5,225,231
[45] Date of Patent: Jul. 6, 1993

[54] PROCESS FOR PRODUCING FLAKE STYLE FOOD

[75] Inventors: Hiroshi Nakaie; Tahiko Inukai, both of Tokyo, Japan

[73] Assignee: Taiyo Fishery Co., Ltd., Tokyo, Japan

[21] Appl. No.: 726,390

[22] Filed: Jul. 5, 1991

[30] Foreign Application Priority Data

Apr. 17, 1991 [JP] Japan .................. 3-112469

[51] Int. Cl.$^5$ .............. A23L 1/315; A23L 1/317; A23L 1/326
[52] U.S. Cl. .................. 426/641; 426/104; 426/574; 426/615; 426/637; 426/643; 426/644; 426/645; 426/646; 426/802
[58] Field of Search ............ 426/641, 643, 644, 645, 426/646, 802, 615, 637, 574, 104

[56] References Cited

U.S. PATENT DOCUMENTS

| | | |
|---|---|---|
| 3,163,541 | 12/1964 | Mainhardt et al. .......... 426/274 |
| 3,903,313 | 9/1975 | Maher et al. .......... 426/641 |
| 4,126,705 | 11/1978 | Hait .......... 426/643 |
| 4,303,688 | 12/1981 | Shimura et al. .......... 426/643 |
| 4,371,560 | 3/1983 | Hockhauser et al. .......... 426/643 |
| 4,652,455 | 3/1987 | Sugino et al. .......... 426/643 |

FOREIGN PATENT DOCUMENTS 0327857 8/1989 European Pat. Off.
3630131 3/1988 Fed. Rep. of Germany.

*Primary Examiner*—Jeanette Hunter
*Assistant Examiner*—Mary S. Mims
*Attorney, Agent, or Firm*—Frishauf, Holtz, Goodman & Woodward

[57] ABSTRACT

The process for producing a flake style food of the present invention comprises adding a dehydrated vegetable to a seasoning solution, emulsifying the obtained mixture by stirring at a high speed of from 1,000 to 10,000 rpm within a temperature zone of from 10° to 80° C. for 1 to 10 minutes and mixing the emulsified product thus obtained with fish meat, poultry meat, cattle meat or artificial meat.

6 Claims, No Drawings

PROCESS FOR PRODUCING FLAKE STYLE FOOD

BACKGROUND OF THE INVENTION

1. Field of the Invention

This invention relates to a process for producing a flake style food. More particularly, it relates to a process for producing flake style food of fish meat, poultry meat, cattle meat or artificial meat which has a good keeping stability and thus neither becomes watery nor suffers from any water liberation during storage following heat sterilization, requires no draining procedure prior to the use, retains the inherent wettable palatable ingredients and never suffers from any deterioration in flavor, texture or color tone.

2. Description of the Prior Art

Flake style foods which have been prepared by thermally sterilizing fish meat, poultry meat, cattle meat or artificial meat in a packaged state are usually seasoned with a seasoning oil, brine or a seasoning solution. They can be either taken as such or used as a material for preparing various dishes, for example, the filling of salads or sandwiches.

When sterilized by heating in a packaged state, such a conventional flake style food would undergo so-called heat dripping (i.e., oozing-out of gravy from flakes). As a result, the flake style food becomes watery or suffers from water liberation during storage. Further, it shows dripping after opening the container. When the flake style food is mixed as such with mayonnaise or sauce (in the case of, for example, the preparation of the filling of salads or sandwiches), the oozing-out of the gravy makes the whole food product watery or causes water liberation, thus deteriorating the qualities of the salads or sandwiches. When the flake style food is to be used as a filling of sandwiches, for example, the oozing gravy moistens the bread and thus deteriorates the inherent texture and flavor of the sandwiches. In order to avoid the above-mentioned deterioration in qualities, it has been attempted to sufficiently drain the flake style food before taking it out of a container so as to use it in a dehydrated state, though it requires much labor. In this case, however, there arises another problem that the gravy containing palatable ingredients is discarded at the draining.

There has been known other methods for solving the above problems by adding a thickener such as starch or gum or soy protein or an emulsifier to a flake style food. However these methods have some disadvantages such that the flavor, texture or color tone of the flake style food is deteriorated or the effect of preventing the water liberation during the storage following heat sterilization is limited.

SUMMARY OF THE INVENTION

It is an object of the present invention to provide a process for producing a flake style food of fish meat, poultry meat, cattle meat or artificial meat which has a good keeping stability and thus neither becomes watery nor suffers from any water liberation during storage following heat sterilization, requires no draining procedure prior to the use, retains the inherent wettable palatable ingredients and never suffers from any deterioration in flavor, texture or color tone.

In the present invention, the aforesaid object can be achieved by providing a process for producing a flake style food which comprises adding a dehydrated vegetable to a seasoning solution, emulsifying the resulting mixture by stirring at a high speed (1,000 to 10,000 rpm) within a temperature zone ranging from 10° to 80° C. for 1 to 10 minutes and then mixing the obtained emulsified product with fish meat, poultry meat, cattle meat or artificial meat.

DETAILED DESCRIPTION OF THE INVENTION

Examples of the dehydrated vegetables to be preferably used in the present invention include ground and mashed dehydrated carrot, pumpkin, onion, sweet potato and potato, dehydrated apple pulp and a dietary fiber powder. It is desirable that the cell tissues of the above-mentioned ground or mashed dehydrated vegetables are not completely broken. Excessive grinding would break the cell tissues. In this case, the starch contained in the cell tissues is liberated and gelatinized by heating. As a result, the flavor, texture or color tone of the flakes might be deteriorated in some cases. However it is not necessarily the case with the dehydrated apple pulp or the dietary fiber powder wherein starch can be hardly liberated.

Examples of the seasoning solution to be used in the present invention include seasoning broth and seasoning brine commonly used for seasoning flake style foods.

Examples of the fish meat, poultry meat, cattle meat or artificial meat to be used in the present invention include those commonly used for producing flake style foods. Particular examples thereof include fish meats such as skipjack, tuna, salmon, cad, crab and scallop meats, poultry meats such as chicken and wild duck meat, cattle meats such as beef, pork, horse meat and mutton and artificial meats such as soy protein meat.

In the present invention, these meats are processed into flakes. These flakes may be either in a small size (2 to 5 mm) suitable as the filling of salads or sandwiches or in a large size (10 to 30 mm) containing meat masses. Namely, these meats may be loosened into piece fitting the common image of flake style foods.

Thus the process of the present invention may be embodied as follows. First, the above-mentioned dehydrated vegetable is added to the above-mentioned seasoning solution and the resulting mixture is emulsified by stirring at a high speed (1,000 to 10,000 rpm) within a temperature zone ranging from 10° to 80° C. for 1 to 10 minutes, preferably at 2,500 to 3,500 rpm within a temperature zone ranging from 40° to 50° C. for 3 to 4 minutes. The dehydrated vegetable may be used in an amount of from 5 to 25 parts (by weight) per 100 parts of the seasoning solution. When the amount of the dehydrated vegetable is less than 5 parts, the resulting product has a poor water retention. When it exceeds 25 parts, on the other hand, the product would be in the form of a mass and thus have a difficulty at the use. When the high speed stirring is performed at a temperature lower than 10° C., the mixture cannot be homogeneously dispersed. When this temperature exceeds 80° C., on the other hand, only a poor emulsion stability is achieved. When the stirring speed is less than 1,000 rpm, only a poor emulsion stability is achieved. When it exceeds 10,000 rpm, on the other hand, the obtained product has a poor water retention. When the stirring time is shorter than 1 minute, the mixture cannot be homogeneously dispersed. When it exceeds 10 minutes, on the other hand, the obtained product has a poor water retention.

The mixture of the dehydrated vegetable and the seasoning solution may contain additives such as common salt or sodium citrate, if required.

Next, the emulsified mixture of the dehydrated vegetable and seasoning solution is mixed with the above-mentioned fish meat, poultry meat, cattle meat or artificial meat to thereby give a flake style food.

The amount of the meat (fish meat, poultry meat, cattle meat or artificial meat) may preferably range from 60 to 95% by weight based on the total weight of the mixture of the emulsified product and the meat, though the present invention is not restricted thereby.

The emulsified product and the meat may be mixed together by stirring for 1 to 3 minutes with the use of, for example, a kneader.

The flake style food thus obtained is then filled in a container, sealed and thermally sterilized to thereby give a flake style food product.

To further illustrate the present invention, the following Examples and Comparative Examples will be given.

EXAMPLE 1

Tuna (weighing 4.1 kg) caught in the South Seas by using a round haul net was thawed and the head and internals were removed. Then the fish was cooked in a cooker at 103° C. When the temperature of the center of the fish reached 67° C., the cooking was ceased and the bones, skins and gills of the fish were removed. Further, the fish meat was divided into red meat and dark meat (i.e., cleaning).

After the completion of the cleaning, the red meat was processed into flakes with a flaker to thereby give tuna flakes. Separately, dehydrated onion chips, common salt and sodium citrate were added to a common seasoning broth at a ratio as specified in Table 1. Then the obtained mixture was stirred at a high speed of 3,000 rpm at 45° C. for 4 minutes. Thus an emulsified mixed paste was obtained.

Next, the above-mentioned tuna flakes and the above-mentioned paste were fed into a kneader together at a ratio specified in Table 1. Then the mixture was stirred for 1 minute. 1005-g portions of the mixture thus obtained were packed in retort pouches and sealed under a reduced pressure of 650 mmHg. The mixture thus packaged was then sterilized by heating at 120° C. for 40 minutes under an elevated pressure of 2 kg/cm². Thus the flake style food of the present invention was obtained.

TABLE 1

| Material | % by weight |
|---|---|
| tuna flakes | 79.4 |
| seasoning broth | 17.8 |
| dehydrated onion chips | 2.0 |
| common salt | 0.4 |
| sodium citrate | 0.4 |
| total | 100.0 |

The flake style food of the present invention thus obtained was stored at 35° C. for 2 weeks and at room temperature for 6 months and the change during the storage period was monitored in each case. As a result, the flake style food neither became watery nor suffered from water liberation in each case. That is to say the flake style food of the present invention had a good keeping stability and retained the inherent wettable palatable ingredients.

The flake style food of the present invention, which had been stored at room temperature for 6 months, was mixed with mayonnaise and used in the preparation of tuna sandwiches. As a result, the bread of the sandwiches did not become watery.

EXAMPLES 2 TO 7

The procedure of Example 1 was repeated except that the dehydrated onion chips were replaced with dehydrated and mashed carrot, pumpkin, potato or sweet potato, dehydrated apple pulp or a dietary fiber powder. Thus the flake style food of the present invention was obtained in each case.

COMPARATIVE EXAMPLES 1 AND 2

The procedure of Example 1 was repeated except that the dehydrated onion chips were replaced with potato starch or corn starch. Thus a flake style food was obtained in each case.

TEST EXAMPLE 1

The flake style foods of the above Examples 1 to 7 and those of the above Comparative Examples 1 and 2 were stored at room temperature for 2 weeks. Then the occurrence of water liberation in each sample was observed. Further, the flavor, texture and color tone of each product were evaluated after storing at room temperature for 2 weeks. Table 2 summarizes the results.

TABLE 2

| Item | Dehydrated vegetable | Water liberation | Flavor | Texture | Color tone |
|---|---|---|---|---|---|
| Ex. No. | | | | | |
| 1 | dehydrated onion chip | no | very good | very good | very good |
| 2 | dehydrated mashed carrot | no | good | good | very good |
| 3 | dehydrated mashed pumpkin | no | good | good | good |
| 4 | dehydrated mashed potato | no | good | good | good |
| 5 | dehydrated mashed sweet potato | no | good | good | good |
| 6 | dehydrated apple pulp | some | very good | good | good |
| 7 | dietary fiber powder*[1] | some | good | good | good |
| Comp. Ex. No. | | | | | |
| 1 | potato starch | yes | good | poor | very good |
| 2 | corn starch | yes | good | poor | very good |

*[1]Sunfiber (a dietary fiber powder obtained by treating galactomannan with an enzyme; a product of Taiyo Kagaku K.K.) was used.

As the above Table 2 shows, each of the flake style foods of Examples 1 to 7 comprising dehydrated vegetables showed no deterioration in water absorption, scarcely suffered from water liberation, did not become sticky via gelatinization and showed excellent flavor, texture and color tone, after the completion of the storage following the heat sterilization.

In contrast, each of the flake style foods of Comparative Examples 1 and 2 comprising potato starch and corn starch suffered from water liberation due to the thermal denaturation of the starch and aging during the storage period. Further, it showed an unpleasant stickiness due to the gelatinization of the starch and had a poor texture.

EXAMPLE 8

A frozen beef chuck block (25 kg/case) was thawed and dipped in a 3% aqueous solution of common salt for 18 hours. After draining, the meat was cooked in a cooker at 103° C. When the temperature at the center of the lump reached 67° C., the cooking was ceased and the meat was quickly cooled with cold air until the temperature at the center of the lump was reduced to 10° C.

Next, the meat was processed into flakes with a flaker to thereby give beef flakes.

Separately, the materials (except beef flakes) listed in Table 3 were treated at the ratio specified in Table 3 in the same manner as the one described in Example 1. Thus an emulsified mixed paste was obtained.

Then the above-mentioned beef flakes and the above-mentioned paste were fed into a kneader at the ratio specified in Table 3 and mixed together by stirring therein for 1 minute. 1005-g portions of the mixture thus obtained were packed in retort pouches and sealed under a reduced pressure of 650 mmHg. The mixture thus packaged was then sterilized by heating at 120° C. for 40 minutes under an elevated pressure of 2 kg/cm$^2$. Thus the flake style food of the present invention was obtained.

TABLE 3

| Material | % by weight |
| --- | --- |
| beef flakes | 79.4 |
| seasoning broth | 17.8 |
| dehydrated carrot grains | 2.0 |
| common salt | 0.4 |
| sodium citrate | 0.4 |
| total | 100.0 |

The flake style food of the present invention thus obtained was stored at 35° C. for 2 weeks and at room temperature for 6 months and the change during the storage period was monitored in each case. As a result, the flake style food neither became watery nor suffered from water liberation in each case. That is to say, the flake style food of the present invention had a good keeping stability and retained the inherent wettable palatable ingredients.

The flake style food of the present invention, which had been stored at room temperature for 6 months, was mixed with mayonnaise and used in the preparation of beef sandwiches. As a result, the bread of the sandwiches did not become watery.

EXAMPLE 9

Bone-free chicken thigh meat was cooked in a cooker at 103° C. until the temperature at the center of the lump reached 75° C. Then the cooking was ceased and the meat was quickly cooled with cold air until the temperature at the center of the lump was reduced to 10° C. After removing the skin, the meat was dipped in a rice boiler filled with hot water at 95° C. for 30 seconds so as to remove collagen adhering to its surface.

Next, the meat was processed into flakes with a flaker to thereby give chicken flakes.

Separately, the materials (except chicken flakes) listed in Table 4 were treated at the ratio specified in Table 4 in the same manner as the one described in Example 1. Thus an emulsified mixed paste was obtained.

Then the above-mentioned chicken flakes and the above-mentioned paste were fed into a kneader at the ratio specified in Table 4 and mixed together by stirring therein for 1 minute. 1005-g portions of the mixture thus obtained were packed in retort pouches and sealed under a reduced pressure of 650 mmHg. The mixture thus packaged was then sterilized by heating at 120° C. for 40 minutes under at elevated pressure of 2 kg/cm$^2$. Thus the flake style food of the present invention was obtained.

TABLE 4

| Material | % by weight |
| --- | --- |
| chicken flakes | 79.4 |
| seasoning broth | 17.8 |
| mashed potato | 2.0 |
| common salt | 0.4 |
| sodium citrate | 0.4 |
| total | 100.0 |

The flake style food of the present invention thus obtained was stored at 35° C. for 2 weeks and at room temperature for 6 months and the change during the storage period was monitored in each case. As a result, the flake style food neither became watery nor suffered from water liberation in each case. That is to say, the flake style food of the present invention had a good keeping stability and retained the inherent wettable palatable ingredients.

The flake style food of the present invention, which had been stored at room temperature for 6 months, was mixed with mayonnaise and used in the preparation of chicken sandwiches. As a result, the bread of the sandwiches did not become watery.

EXAMPLE 10

An artificial meat (fibrous soy protein) was cut into pieces with a silent cutter to thereby give soybean protein flakes.

Separately, the materials (except soy protein flakes) listed in Table 5 were treated at the ratio specified in Table 5 in the same manner as the one described in Example 1. Thus an emulsified mixed paste was obtained.

Then the above-mentioned soy protein flakes and the above-mentioned paste were fed into a kneader at the ratio specified in Table 5 and mixed together by stirring therein for 1 minute. 1005-g portions of the mixture thus obtained were packed in retort pouches and sealed under a reduced pressure of 650 mmHg. The mixture thus packaged was then sterilized by heating at 120° C. for 40 minutes under an elevated pressure of 2 kg/cm$^2$. Thus the flake style food of the present invention was obtained.

TABLE 5

| Material | % by weight |
| --- | --- |
| soy protein flakes | 84.4 |
| seasoning broth | 17.8 |
| dehydrated pumpkin powder | 2.0 |
| common salt | 0.2 |
| sodium citrate | 0.4 |
| hydrolyzed animal protein (Polyamy) | 0.2 |
| total | 100.0 |

The flake style food of the present invention thus obtained was stored at 35° C. for 2 weeks and at room temperature for 6 months and the change during the storage period was monitored in each case. As a result, the flake style food neither became watery nor suffered from water liberation in each case. That is to say, the flake style food of the present invention had a good keeping stability and retained the inherent wettable palatable ingredients.

The flake style food of the present invention, which had been stored at room temperature for 6 months, was mixed with mayonnaise and used in the preparation of soy protein artificial meat sandwiches. As a result, the bread of the sandwiches did not become watery.

As described above, the process for producing a flake style food of the present invention makes it possible to obtain a flake style food of fish meat, poultry meat, cattle meat or artificial meat which has a good keeping stability and thus neither becomes watery nor suffers from water liberation during storage following heat sterilization, requires no draining procedure prior to the use, retains the inherent wettable palatable ingredients and does not suffer from any deterioration in flavor, texture or color tone.

What is claimed is:

1. A process for producing a flake style food which comprises adding a dehydrated vegetable to a seasoning solution, emulsifying the obtained mixture by stirring at a high speed of from 1,000 to 10,000 rpm within a temperature range of from 10° to 80° C. for 1 to 10 minutes and mixing the emulsified product thus obtained with fish meat, poultry meat or cattle meat which is in the form of flakes.

2. A process for producing a flake style food as claimed in claim 1, wherein said dehydrated vegetable is selected from the group consisting of ground or mashed dehydrated carrot, pumpkin, onion, sweet potato and potato, and dehydrated apple pulp.

3. A process for producing a flake style food as claimed in claim 2, wherein said dehydrated vegetable is used in an amount of from 5 to 25 parts by weight per 100 parts by weight of the seasoning solution.

4. A process for producing a flake style food which comprises adding a dehydrated vegetable to a seasoning solution, emulsifying the obtained mixture by stirring at a high speed of from 1,000 to 10,000 rpm within a temperature range of from 10° to 80° C. for 1 to 10 minutes and mixing the emulsified product thus obtained with fish meat, poultry meat or cattle meat, said fish meat, poultry meat or cattle meat being used in such an amount as to adjust its content in the total mixture of said emulsified product and said fish meat, poultry meat or cattle meat to 60 to 95% by weight.

5. A process for producing a flake style food as claimed in claim 4, wherein said dehydrated vegetable is selected from the group consisting of ground or mashed dehydrated carrot, pumpkin, onion, sweet potato and potato, and dehydrated apple pulp.

6. A process for producing a flake style food as claimed in claim 4, wherein said dehydrated vegetable is used in an amount of from 5 to 25 parts by weight per 100 parts by weight of the seasoning solution.

* * * * *

UNITED STATES PATENT AND TRADEMARK OFFICE
CERTIFICATE OF CORRECTION

PATENT NO. : 5,225,231
DATED : July 6, 1993
INVENTOR(S) : NAKAIE et al

It is certified that error appears in the above-identified patent and that said Letters Patent is hereby corrected as shown below:

Column 8, line 7 (Claim 3): delete "claim 2" and insert --claim 1--.

Signed and Sealed this

Seventh Day of March, 1995

Attest:

BRUCE LEHMAN

Attesting Officer     Commissioner of Patents and Trademarks